(12) United States Patent
Marumoto et al.

(10) Patent No.: US 7,934,923 B2
(45) Date of Patent: May 3, 2011

(54) SCREW, INJECTION APPARATUS, AND PRESSURE MEMBER

(75) Inventors: Hirotsugu Marumoto, Chiba (JP); Munekatsu Kamiya, Kowloon Bay (CN)

(73) Assignees: Sumitomo Heavy Industries, Ltd., Tokyo (JP); Spiral Logic Limited, Hong Kong (CN)

( * ) Notice: Subject to any disclaimer, the term of this patent is extended or adjusted under 35 U.S.C. 154(b) by 370 days.

(21) Appl. No.: 12/086,475

(22) PCT Filed: Dec. 7, 2006

(86) PCT No.: PCT/JP2006/324433
§ 371 (c)(1),
(2), (4) Date: Jun. 13, 2008

(87) PCT Pub. No.: WO2007/069522
PCT Pub. Date: Jun. 21, 2007

(65) Prior Publication Data
US 2010/0215792 A1 Aug. 26, 2010

(30) Foreign Application Priority Data
Dec. 15, 2005 (JP) .................................. 2005-362227

(51) Int. Cl.
*B29C 45/60* (2006.01)
(52) U.S. Cl. ....................................... 425/542; 425/563
(58) Field of Classification Search .................. 425/542, 425/563
See application file for complete search history.

(56) References Cited

U.S. PATENT DOCUMENTS

| 3,689,184 A | 9/1972 | Morse |
| 4,477,242 A | 10/1984 | Eichlseder et al. |

(Continued)

FOREIGN PATENT DOCUMENTS

| DE | 25 29 707 A1 | 1/1977 |
| DE | 43 26 585 C1 | 8/1994 |

(Continued)

OTHER PUBLICATIONS

Supplementary European Search Report, European Patent Application No. EP 06 83 4188, Date of Completion: Oct. 25, 2010, 1 page.

*Primary Examiner* — Tim Heitbrink
(74) *Attorney, Agent, or Firm* — Squire, Sanders & Dempsey (US) LLP

(57) ABSTRACT

An object is to reduce the cost of a screw (20) and improve the quality of molded products. A rear end of the screw (20) is connected to a drive apparatus. The screw includes a screw head, a reverse-flow prevention apparatus, and a plasticizing member disposed rearward of the reverse-flow prevention apparatus. The plasticizing member includes a screw body (52), a flight (53) projectingly formed on an outer circumferential surface of the screw body (52), and a pressure member (54) formed to extend over a predetermined distance from the front end of the screw body (52) and to be located adjacent to the reverse-flow prevention apparatus. The pressure member (54) has a flat outer circumferential surface. Since the pressure member (54) has a flat outer circumferential surface having a diameter equal to or greater than the diameter of the screw body (52), the shape of the screw (20) can be simplified, and the cost of the screw (20) can be lowered. In addition, the number of locations where a molding material stagnates can be reduced.

11 Claims, 7 Drawing Sheets

U.S. PATENT DOCUMENTS

| | | | |
|---|---|---|---|
| 4,643,665 A * | 2/1987 | Zeiger | 425/563 |
| 6,042,362 A | 3/2000 | Mitsui | |
| 7,556,753 B2 * | 7/2009 | Uchiyama et al. | 425/125 |
| 7,578,952 B2 * | 8/2009 | Shiozawa et al. | 264/40.5 |
| 7,722,349 B2 * | 5/2010 | Oomori et al. | 425/145 |

FOREIGN PATENT DOCUMENTS

| | | | |
|---|---|---|---|
| JP | 54-050070 A | 4/1979 | |
| JP | 63-288725 A | 11/1988 | |
| JP | 02-070051 A | 3/1990 | |
| JP | 04-016055 | 1/1992 | |
| JP | 06-304978 | 11/1994 | |
| JP | 2002-248664 | 9/2002 | |
| JP | 2002-361696 | 12/2002 | |
| JP | 2005-161809 A | 6/2005 | |
| SU | 1412983 A1 | 7/1988 | |

* cited by examiner

FIG. 4

| L/D | 0.70 | 0.85 | 1.00 | 1.15 | 1.30 |
|-----|------|------|------|------|------|
|     | ×    | ○    | ○    | ○    | ×    |

FIG. 5

| t1/t2 | 0.03 | 0.06 | 0.12 | 0.18 | 0.21 | 0.24 | 0.27 | 0.30 |
|---|---|---|---|---|---|---|---|---|
|  | x | △ | O | O | ◎ | ◎ | ◎ | ◎ |

| 0.36 | 0.45 | 0.48 | 0.61 | 0.80 | 1 | 1.2 |
|---|---|---|---|---|---|---|
| O | O | △ | △ | △ | △ | x |

SCREW, INJECTION APPARATUS, AND PRESSURE MEMBER

TECHNICAL FIELD

The present invention relates to a screw, an injection apparatus, and a pressure member.

BACKGROUND ART

Conventionally, in a molding machine; for example, in an injection-molding machine, resin heated and melted in a heating cylinder is injected under high pressure and charged into a cavity of a mold apparatus, and the injected resin is cooled and solidified in the cavity, whereby a molded product is obtained.

For such a molding operation, the injection-molding machine includes a mold apparatus, a mold-clamping apparatus and an injection apparatus. The mold-clamping apparatus includes a stationary platen and a movable platen. The movable platen is advanced and retreated by means of a mold-clamping cylinder, whereby the mold apparatus is closed, clamped, and opened.

Meanwhile, the injection apparatus, which is generally of an in-line screw type, includes a heating cylinder for heating and melting resin fed from a hopper, and an injection nozzle for injecting the molten resin. A screw is disposed in the heating cylinder in a reciprocative and rotatable condition. When the screw is advanced by means of a drive section connected to the rear end thereof, resin is injected from the injection nozzle. When the screw is retreated by means of the drive section, metering of resin is performed.

FIG. 1 is a cross sectional view showing a main portion of a conventional injection apparatus.

In this drawing, reference numeral 11 denotes a heating cylinder. An injection nozzle 12 is attached to the front end of the heating cylinder 11, and a screw 14 is disposed within the heating cylinder 11 such that the screw 14 can rotate and can advance and retreat. The screw 14 is composed of a flight portion 15 and an injection portion 16, and is connected to an unillustrated drive apparatus via a shaft portion 21 at the rear end. The injection portion 16 is composed of a head portion 41, a rod portion 42 extending rearward from the head portion 41, a check ring 43 disposed around the rod portion 42, and a seal ring 44 attached to the front end of the flight portion 15. Notably, the head portion 41, the rod portion 42, etc. constitute a screw head. Further, the check ring 43 and the seal ring 44 serve as a reverse-flow prevention apparatus for preventing reverse flow of resin during an injection step. The drive apparatus is composed of an injection motor and a metering motor. The flight portion 15 has a cylindrical body of the screw; i.e., a screw body, and a spiral flight 23 formed on the outer circumferential surface of the screw body, so that a spiral groove 24 is formed along the flight 23.

A supply port 25 is formed in the heating cylinder 11 in the vicinity of the rear end thereof, and an unillustrated funnel-shaped hopper is disposed at the supply port 25. Resin in the form of pellets stored in the hopper is supplied to the interior of the heating cylinder 11 via the supply port 25.

The supply port 25 is formed at a location such that the supply port 25 faces a rear end portion of the groove 24 when the screw 14 is positioned at the fowardmost position within the heating cylinder 11; i.e., at the advancement limit position. The flight portion 15 has a supply portion P1, a compression portion P2, and a metering portion P3, formed in this sequence from the rear end to the front end. The supply portion P1 receives the resin supplied via the supply port 25. The compression portion P2 melts the supplied resin while compressing the resin. The metering portion P3 meters a predetermined amount of the molten resin each time.

In the injection apparatus having the above-described configuration, in a metering step, the screw 14 is rotated through drive of the metering motor. Thus, the resin supplied from the hopper into the heating cylinder 11 is caused to advance along the groove 24, and is heated and melted. With this operation, the screw 14 is retreated. Since the check ring 43 moves forward in relation to the rod portion 42 as the screw 14 is retreated, the resin having reached the front end of the flight portion 15 passes through a resin passage between the rod portion 42 and the check ring 43, and reaches a space located forward of the screw head. Accordingly, an amount of molten resin corresponding to a single shot is accumulated forward of the screw head, in a state in which the screw 14 is positioned at the rearwardmost position within the heating cylinder 11; i.e., at the retreat limit position.

Subsequently, in an injection step, the screw 14 is advanced through drive of the injection motor, whereby the resin accumulated forward of the screw head is injected from the injection nozzle 12, and is charged into a cavity of an unillustrated mold apparatus.

DISCLOSURE OF THE INVENTION

Problems to be Solved by the Invention

However, in the conventional injection apparatus, the diameter of the screw body must be set such that the diameter is constant in the supply portion P1 and the metering portion P3, and increases in the compression portion P2 from the rear end toward the front end thereof. Since the shape of the screw 14 becomes complex, the cost of the screw 14 increases. In addition, the complex shape increases the number of locations where resin stagnates, so that burning of resin; i.e., resin burning, occurs, and the quality of molded products deteriorates.

An object of the present invention is to solve the above-mentioned problems in the conventional injection apparatus and to provide a screw, an injection apparatus, and a pressure member which can reduce the cost of the screw and improve the quality of molded products.

Means for Solving the Problems

In order to achieve the above object, the present invention provides a screw disposed within a heating cylinder such that the screw can rotate and can advance and retreat, a rear end of the screw being connected to a drive apparatus.

The screw includes a screw head, a reverse-flow prevention apparatus, and a plasticizing member disposed rearward of the reverse-flow prevention apparatus.

The plasticizing member includes a screw body, a flight projectingly formed on an outer circumferential surface of the screw body, and a pressure member formed to extend over a predetermined distance from the front end of the screw body and to be located adjacent to the reverse-flow prevention apparatus.

The pressure member has a flat outer circumferential surface having a diameter equal to or greater than the diameter of the screw body.

Effects of the Invention

A screw according to the present invention is disposed within a heating cylinder such that the screw can rotate and can advance and retreat, and a rear end of the screw is connected to a drive apparatus.

The screw includes a screw head, a reverse-flow prevention apparatus, and a plasticizing member disposed rearward of the reverse-flow prevention apparatus.

The plasticizing member includes a screw body, a flight projectingly formed on an outer circumferential surface of the screw body, and a pressure member formed to extend over a predetermined distance from the front end of the screw body and to be located adjacent to the reverse-flow prevention apparatus.

The pressure member has a flat outer circumferential surface having a diameter equal to or greater than the diameter of the screw body.

In this case, since the pressure member has a flat outer circumferential surface having a diameter equal to or greater than the diameter of the screw body, the shape of the screw can be simplified, and the cost of the screw can be lowered.

In addition, the simplified shape decreases the number of locations where a molding material stagnates, so that burning of the molding material can be prevented, and the quality of molded products can be improved.

BRIEF DESCRIPTION OF DRAWINGS

FIG. 4 is a first chart showing the characteristics of the injection apparatus according to the first embodiment of the present invention.

FIG. 5 is a second chart showing the characteristics of the injection apparatus according to the first embodiment of the present invention.

DESCRIPTION OF SYMBOLS

Figure 1:
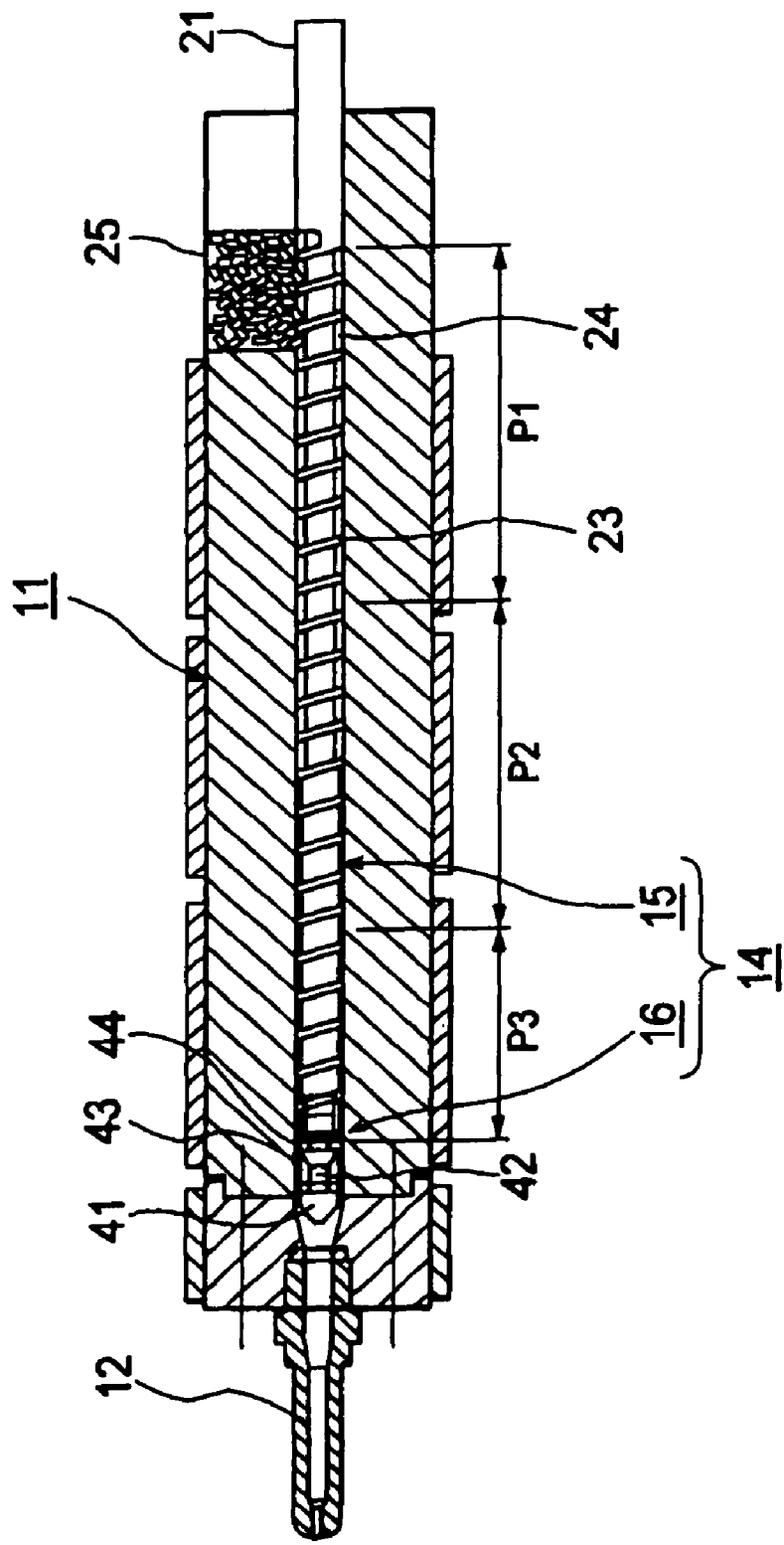
FIG. 1 is a cross sectional view showing a main portion of a conventional injection apparatus.

17: heating cylinder
20: screw
45: flight portion
52: screw body
53: flight
54: pressure member
61: screw head
62: reverse-flow prevention apparatus
71, 171, 271: inclined portion
72, 172: large diameter portion

BEST MODE FOR CARRYING OUT THE INVENTION

The embodiments of the present invention will next be described in detail with reference to the drawings. Here, an injection apparatus of an injection-molding machine, which is an example molding machine, will be described.

Figure 2:
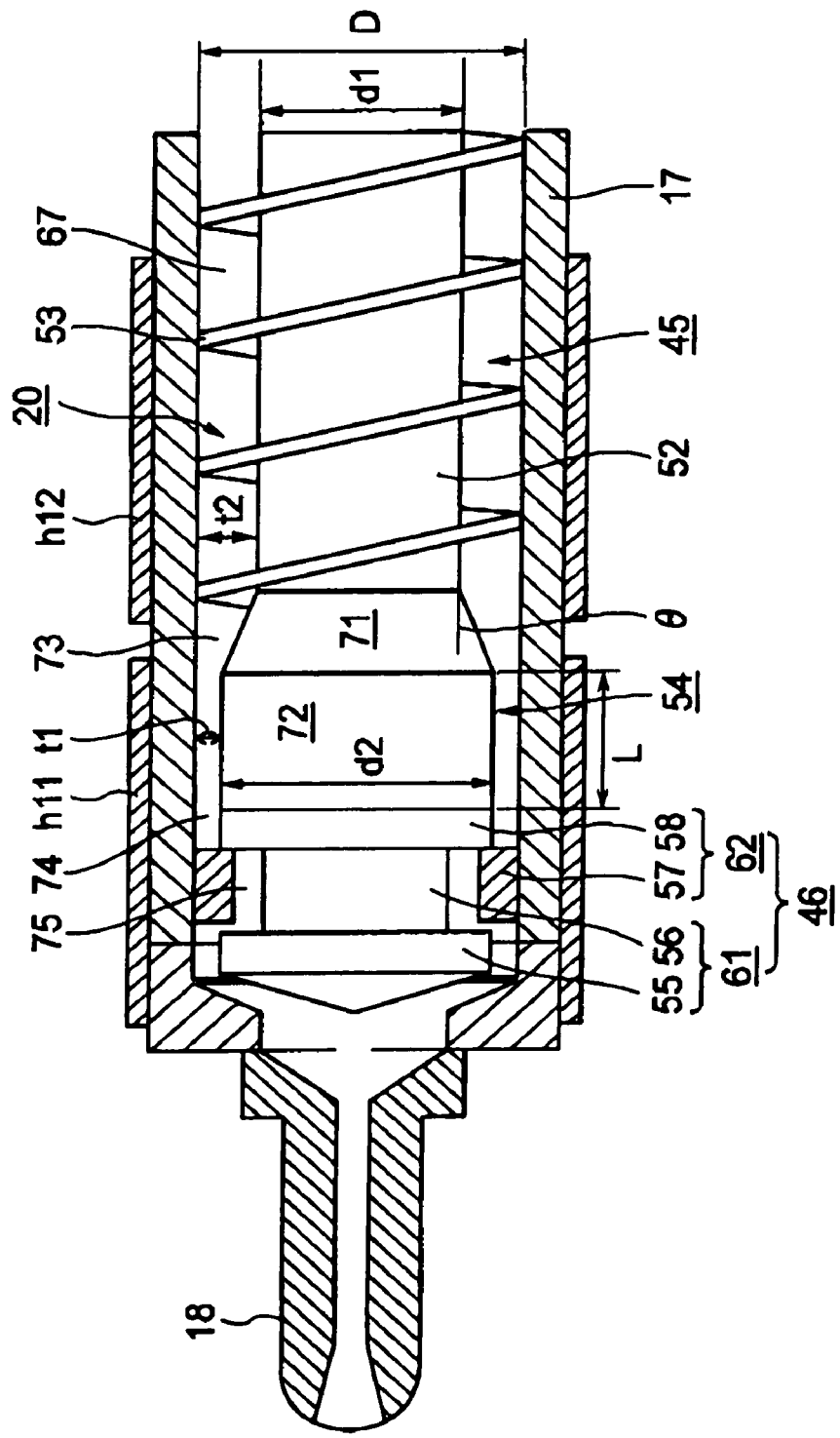
FIG. 2 is an enlarged view showing a main portion of an injection apparatus according to a first embodiment of the present invention.
Figure 3:
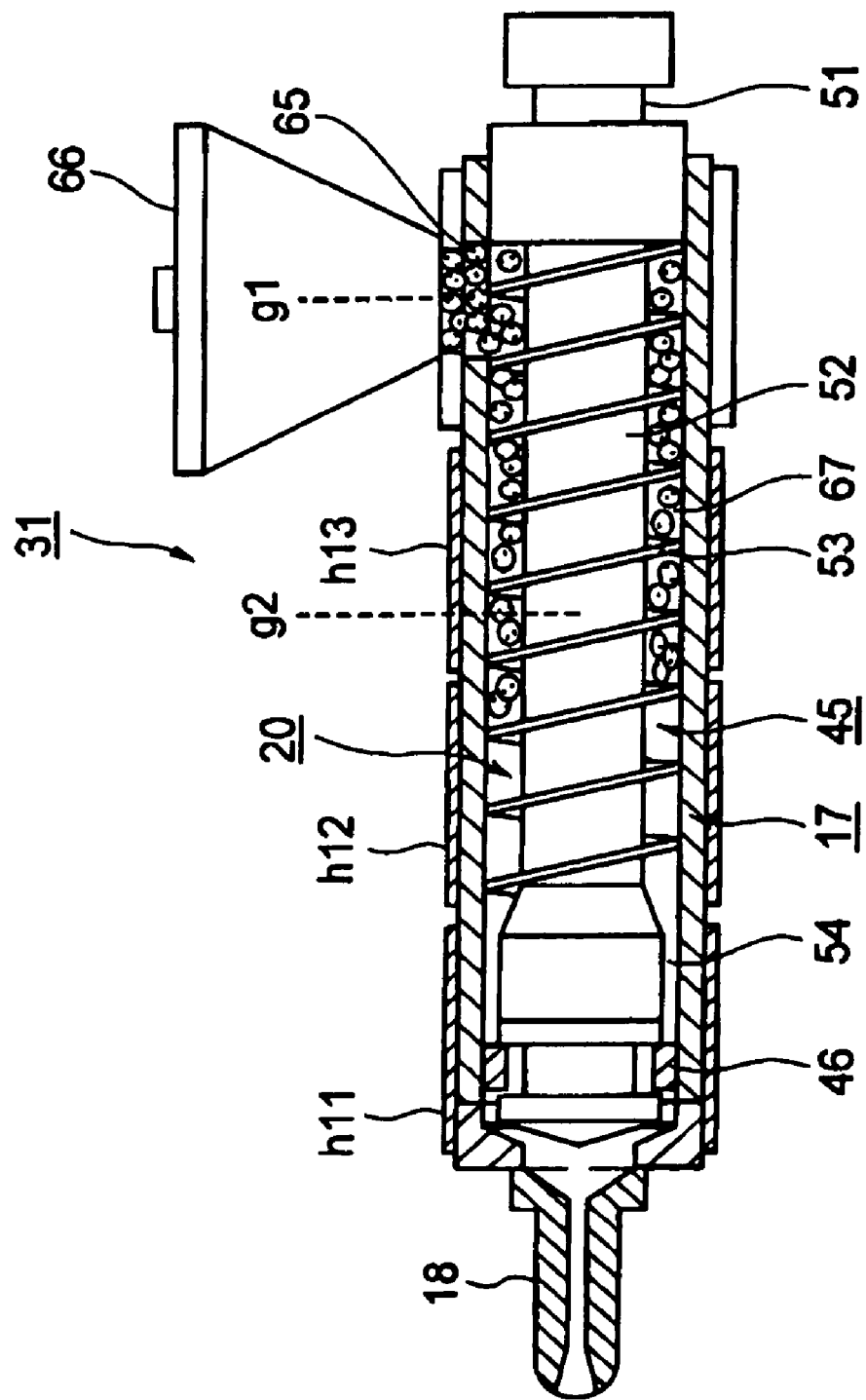
FIG. 3 is a conceptional view showing the main portion of the injection apparatus according to the first embodiment of the present invention.
Figure 4:
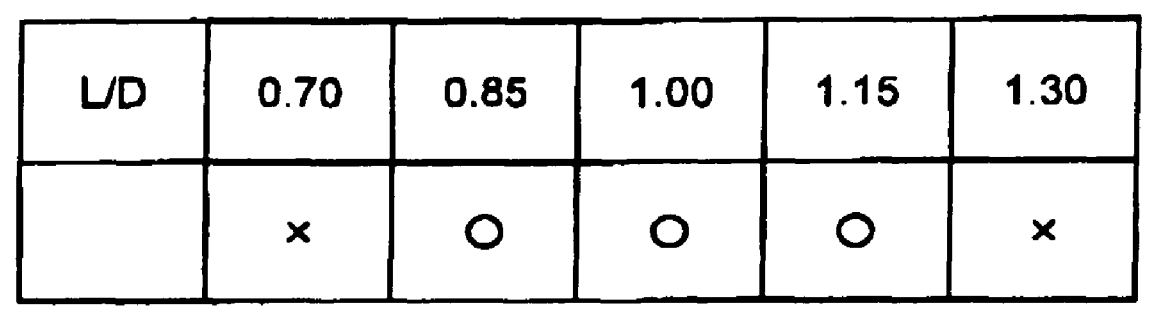

FIG. 2 is an enlarged view showing a main portion of an injection apparatus according to a first embodiment of the present invention; FIG. 3 is a conceptional view showing the main portion of the injection apparatus according to the first embodiment of the present invention; FIG. 4 is a first chart showing the characteristics of the injection apparatus according to the first embodiment of the present invention; and FIG. 5 is a second chart showing the characteristics of the injection apparatus according to the first embodiment of the present invention.

In these drawings, reference numeral 31 denotes an in-line-screw-type injection apparatus of an injection molding machine. The injection molding machine includes an unillustrated mold apparatus, a mold-clamping apparatus, and the injection apparatus 31. The mold apparatus includes a stationary mold, which serves as a first mold, and a movable mold, which servers as a second mold. The mold-clamping apparatus includes a stationary platen, to which the stationary mold is mounted, and a movable platen, to which the movable mold is mounted. The movable platen is advanced and retreated by means of a mold-clamping cylinder, whereby the mold apparatus is closed, clamped, and opened.

The injection apparatus 31 includes a heating cylinder 17 serving as a cylinder member; an injection nozzle 18 serving as a nozzle member and attached to the front end of the heating cylinder 17; a screw 20 serving as an injection member and disposed within the heating cylinder 17 such that the screw 20 can rotate and can advance and retreat; heaters h11 to h13 serving as a heating member and attached to the outer circumference of the heating cylinder 17; and an unillustrated drive apparatus disposed rearward of the heating cylinder 17.

The screw 20 includes a flight portion 45 serving as a plasticizing member and an injection portion 46, and is connected to the drive apparatus via a shaft portion 51 at the rear end. The flight portion 45 includes a bar-shaped screw body 52 serving as an injection member body, a spiral flight 53 projectingly formed on the outer circumferential surface of the screw body 52; and a pressure member 54 serving as a compressing/kneading portion and removably attached to the screw body 52 at its front end. A spiral groove 67 is formed along the flight 53. In the screw body 52, over the entire region of the flight portion 45; i.e., from the front end to the rear end thereof, the flight 53 is formed at a, constant pitch, the flight 53 has a constant outer diameter, that is a flight crest diameter D, the screw body 52 has a constant diameter, that is a flight trough diameter d1, and the groove 67 has a constant depth.

The pressure member 54 is formed to extend over a predetermined range from the front end of the screw body 52 and to be located adjacent to a reverse-flow prevention apparatus 62, which will be described later. Thus, the pressure member 54 forms, over a predetermined distance, a flat region in which neither the flight 53 nor the groove 67 is formed on the surface of the flight portion 45. The pressure member 54 includes an inclined portion 71 serving as a first pressure portion, and a large-diameter portion 72 serving as a cylindrical columnar portion and a second pressure portion. The inclined portion 71 is formed such that its diameter increases frontward, and has a conical shape. The large-diameter portion 72 is formed adjacent to the front end of the inclined portion 71 to be integral therewith. The large-diameter portion 72 has a cylindrical columnar shape and has a constant diameter d2 over the entire length. Each of the inclined portion 71 and the large-diameter portion 72 has a flat outer circumferential surface having no unevenness.

Further, an unillustrated screw portion is formed at the rear of the inclined portion 71, and an unillustrated screw hole is formed in the screw body 52 such that the screw hole is opened at the front end surface thereof. Accordingly, the pressure member 54 can be attached to the screw body 52 through screw-engagement of the screw portion with the screw hole. Notably, in the present embodiment, the pressure member 54 is fixed to the screw body 52 by means of screw engagement. However, the pressure member 54 can be fixed to the screw body 52 by means of welding in place of screw engagement.

The angle θ between the outer circumferential surface of the inclined portion 71 and the axis of the heating cylinder 17 is previously set to satisfy the following relation:

$$0°≦θ≦60°.$$

The diameter of the front end of the inclined portion 71 is made equal to the diameter d2 of the large-diameter portion 72, and the diameter of the rear end of the inclined portion 71 is made equal to the flight trough diameter d1. Notably, in the present embodiment, the outer circumferential surface of the inclined portion 71 has a constant inclination; however, if necessary, the outer circumferential surface may be curved in accordance with a predetermined function. When the angle θ is 0°, the flat outer circumferential surface constitutes an outer circumferential surface of a cylindrical columnar portion which is formed to be integral with the screw body 52 and has a constant diameter.

A resin passage 73, serving as a first molding material passage, is formed between the inclined portion 71 and the heating cylinder 17, and a resin passage 74, serving as a second molding material passage, is formed between the large-diameter portion 72 and the heating cylinder 17. In this case, as described above, the diameter of the inclined portion 71 increases frontward, so that the cross sectional area of the resin passage 73 decreases frontward. Since the diameter d2 of the large-diameter portion 72 is constant over its length, the cross sectional area of the resin passage 74 is maintained constant over the entire length of the resin passage 74.

Meanwhile, the injection portion 46 includes a head portion 55 having a conical portion at its front end; a rod portion 56 formed rearward of and adjacent to the head portion 55; a check ring 57 disposed around the rod portion 56; and a seal ring 58 attached to the front end of the flight portion 45. A resin passage 75, serving as a third molding material passage, is formed between the rod portion 56 and the check ring 57.

Further, an unillustrated screw portion is formed at the rear of the rod portion 56, and an unillustrated screw hole is formed in the pressure member 54 such that the screw hole is opened at the front end surface thereof. Accordingly, through screw-engagement of the screw portion with the screw hole, the injection member 46 can be attached to the flight portion 45 with the seal ring 58 pressed against the front end of the pressure member 54. Notably, the head portion 55, the rod portion 56, and the screw portion constitute a screw head 61, which serves as an injection member head portion; and the check ring 57 and the seal ring 58 constitute the reverse-flow prevention apparatus 62, which prevents reverse flow of resin during an injection step. In a metering step, when the check ring 57 is caused to move forward in relation to the rod portion 56 as the screw 20 is retreated, the check ring 57 is separated from the seal ring 58, so that the resin passage 74 communicates with the resin passage 75, and the reverse-flow prevention apparatus 62 stops its sealing operation. In an injection step, when the check ring 57 is caused to move rearward in relation to the rod portion 56 as the screw 20 is advanced, the check ring 57 is brought into contact with the seal ring 58, so that the communication between the resin passage 74 and the resin passage 75 is broken, and the reverse-flow prevention apparatus 62 starts its sealing operation.

The drive apparatus includes a metering motor, serving as a drive portion for metering, and an injection motor, serving as a drive portion for injection.

A resin supply port 65, serving as a molding material supply port, is formed in the heating cylinder 17 at a predetermined position in the vicinity of the rear end thereof, and a funnel-shaped hopper 66 is connected to the resin supply port 65. Resin in the form of pellets stored in the hopper 66 is supplied to the interior of the heating cylinder 17 via the resin supply port 65.

The resin supply port 65 is formed at a location such that the resin supply port 65 faces a rear end portion of the groove 67 when the screw 20 is positioned at the fowardmost position within the heating cylinder 17; i.e., at the advancement limit position. The resin supply port 65 forms a molding material supply point g1 on the screw 20 positioned at the advancement limit position.

In the injection apparatus 31 having the above-described configuration, in a metering step, the screw 20 is rotated in a normal direction through drive of the metering motor in a normal direction. Thus, the resin supplied from the hopper 66 into the heating cylinder 17 is caused to advance along the groove 67, and is heated and melted by the heaters h11 and h12. The pressure of the resin increases gradually as the resin advances to the front end of the screw body 52 from a pressure increase start point g2 which is shifted rearward from the flight portion 45 by a predetermined distance.

Subsequently, the resin is caused to pass through the resin passage 73, whereby the pressure of the resin increases further, and is caused to advance while passing through the resin passage 74. Therefore, the resin is kneaded sufficiently.

At this time, since the check ring 57 is moved forward in relation to the rod portion 56, communication is established between the resin passage 74 and the resin passage 75, so that the resin within the resin passage 74 is caused to pass through the resin passage 75 to be fed to the space forward of the screw head 61. Accordingly, an amount of molten resin corresponding to a single shot is accumulated in the space forward of the screw head 61 in a state in which the screw 20 is positioned at the rearwardmost position within the heating cylinder 17; i.e., at the retreat limit position. Notably, an unillustrated cut is formed in the head portion 55 such that the resin passage 75 communicates with the space forward of the screw head 61.

Subsequently, in an injection step, the screw 20 is advanced through drive of the injection motor, whereby the resin accumulated forward of the screw head 61 is injected from the injection nozzle 18, and is charged into a cavity of an unillustrated mold apparatus.

Incidentally, as described above, in the flight portion 45, the pressure member 54 is formed in a predetermined range extending from the front end of the flight portion 45 in such a manner that the pressure member 54 is located adjacent to the reverse-flow prevention apparatus 62. Further, in the pressure member 54, neither the flight 53 nor the groove 67 is formed, so that the pressure member 54 has a flat outer circumferential surface.

That is, the resin supplied from the resin supply port is caused to advance within the groove 67, while being guided by the flight 53, as the screw 20 rotates in a metering step. However, when the resin reaches the pressure member 54, the resin is not guided by the flight 53, because the flight 53 is not formed on the pressure member 54, so that the force by which the resin is advanced decreases.

Accordingly, the moving speed of the resin decreases in the resin passages 73 and 74. Therefore, the pressure member 54 functions as a movement restriction member for restricting advancement of the resin caused to advance within the groove 67 from the rear. As a result, since advancement of the resin within the groove 67 is restricted, in a region forward of the pressure increase start point g2, the resin pressure increases toward the front.

Further, in the pressure member 54, the diameter of the inclined portion 71 increases toward the front so that the cross sectional area of the resin passage 73 decreases toward the front, and the diameter d2 of the large-diameter portion 72 is greater than the flight trough diameter d1 but smaller than the flight crest diameter D. Accordingly, the function of the pressure member 54 as a movement-restriction member can be enhanced further, whereby the pressure of resin in the region located forward of the pressure increase start point g2 can be increased further.

As a result, in a state in which the screw 20 is located at the advancement limit position, the region between the molding material supply point g1 and the pressure increase start point g2 constitutes a supply portion; the region between the pressure increase start point g2 and the front end of the screw body 52 constitutes a compression portion; and the region between the front end of the screw body 52 and the front end of the pressure member 54 constitutes a metering portion. Therefore, plasticization similar to that performed in conventional injection apparatuses can be performed, so that resin can be kneaded sufficiently.

Further, the resin pressure at the compression portion can be increased through mere formation of the large-diameter portion 72, and the flight trough diameter d1 is not required to be changed along the axis of the screw body 52.

Since the shape of the screw 20 can be simplified, the cost of the screw 20 can be lowered. Further, the simplified shape decreases the number of locations where resin stagnates. Since generation of resin burning can be prevented, the quality of molded products can be improved.

Next, with reference to FIG. 4, there will be described the characteristics of the injection apparatus for various values of the ratio L/D; i.e., the ratio of the axial length L of the large-diameter portion 72 to the flight crest diameter D.

In FIG. 4, ○ represents that the characteristics of the injection apparatus are good, and X represents that the characteristics of the injection apparatus are poor.

As can be understood from FIG. 4, when the ratio L/D is not less than 0.85 and not greater than 1.15, the resin-kneading property is good, the stress distribution within a molded product is uniform, the energy loss is small, and resin burning does not occur. In contrast, when the ratio L/D is less than 0.85, the resin-kneading property becomes poor, and the stress distribution within a molded product becomes non-uniform. Further, when the ratio of L/D is greater than 1.15, the energy loss increases, and resin burning occurs.

Accordingly, the injection apparatus can have good characteristics when the ratio L/D is determined to satisfy the following relation:

$0.85 \leq L/D \leq 1.15.$

Thus, the resin-kneading property can be improved, the stress distribution within a molded product can be made uniform, energy loss can be reduced, and generation of resin burning can be avoided.

Next, with reference to FIG. 5, there will be described the characteristics of the injection apparatus for various values of the ratio t1/t2; i.e., the radial distance t1 between the outer circumferential surface of the large-diameter portion 72 and the circumferential edge of the flight 53 to the radial distance t2 between the outer circumferential surface of the screw body 52 and the circumferential edge of the flight 53.

In FIG. 5, ⊙ represents that the characteristics of the injection apparatus are considerably good, ○ represents that the characteristics of the injection apparatus are good, Δ represents that a predetermined characteristic of the injection apparatus is good; and X represents that the characteristics of the injection apparatus are poor.

As can be understood from FIG. 5, when the ratio t1/t2 is not less than 0.21 and not greater than 0.30, the resin-kneading property is extremely good, the stress distribution within a molded product is extremely uniform, the energy loss is extremely small, and resin burning does not occur at all. In contrast, when the ratio t1/t2 is greater than 0.30 and not greater than 0.45, the resin-kneading property is good, the stress distribution within a molded product is uniform, the energy loss is small, and resin burning does not occur. When the ratio t1/t2 is greater than 0.45 and not greater than 1, the energy loss is small, and resin burning does not occur; however, the resin-kneading property is somewhat poor, the stress distribution within a molded product is somewhat non-uniform. When the ratio t1/t2 is greater than 1, the energy loss is small, and resin burning does not occur; however, the resin-kneading property is poor, and the stress distribution within a molded product is non-uniform.

When the ratio t1/t2 is not less than 0.12 and less than 0.21, the resin-kneading property is good, the stress distribution within a molded product is uniform, the energy loss is small, and resin burning does not occur. When the ratio t1/t2 is not less than 0.06 and less than 0.12, the resin-kneading property is good, and the stress distribution within a molded product is uniform; however, the energy loss is somewhat large, and resin burning occurs slightly. When the ratio t1/t2 is less than 0.06, the resin-kneading property is good, and the stress distribution within a molded product is uniform; however, the energy loss is large, and resin burning occurs.

Accordingly, at least a predetermined characteristic of the injection apparatus 31 can be improved when the ratio t1/t2 is determined to satisfy the following relation.

$0.06 \leq t1/t2 \leq 1$

Thus, the resin-kneading property can be improved, the stress distribution within a molded product can be made uniform, and generation of resin burning can be avoided.

Further, the characteristics of the injection apparatus 31 can be improved when the ratio t1/t2 is determined to satisfy the following relation.

$0.12 \leq t1/t2 \leq 0.45$

Thus, the resin-kneading property can be improved, the stress distribution within a molded product can be made uniform, the energy loss can be reduced, and generation of resin burning can be avoided.

The characteristics of the injection apparatus 31 can be improved considerably when the ratio t1/t2 is determined to satisfy the following relation.

$0.21 \leq t1/t2 \leq 0.30$

Thus, the resin-kneading property can be improved considerably, the stress distribution within a molded product can be made considerably uniform, the energy loss can be reduced considerably, and generation of resin burning can be avoided without fail.

Next, a second embodiment of the present invention will be described. Notably, components having the same structures as those in the first embodiment are denoted by the same reference numerals, and their repeated descriptions are omitted. For the effect that the second embodiment yields through employment of the same structure, the description of the effect of the first embodiment is incorporated herein by reference.

Figure 6:
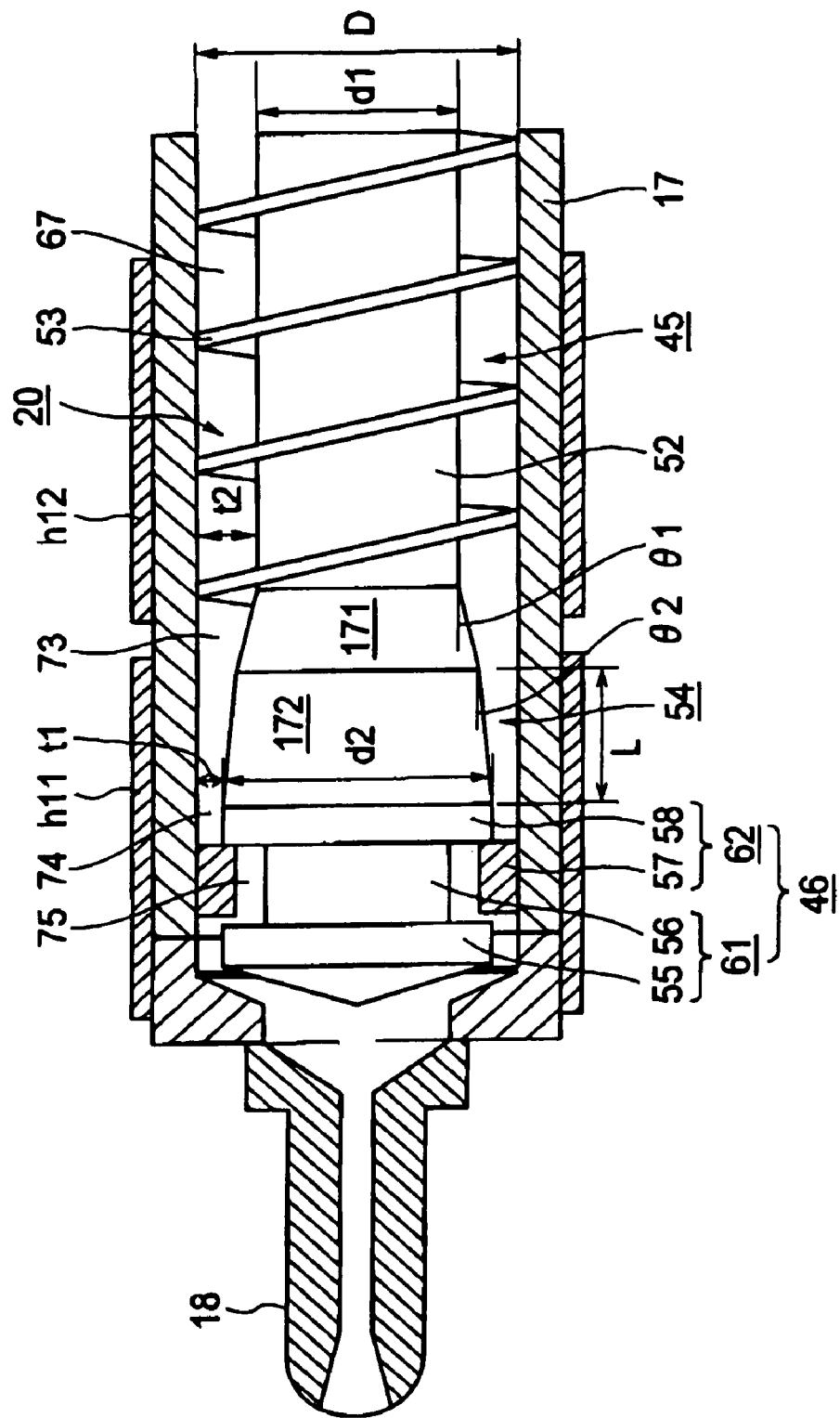
FIG. 6 is an enlarged view showing a main portion of an injection apparatus according to a second embodiment of the present invention.

FIG. 6 is an enlarged view showing a main portion of an injection apparatus according to the second embodiment of the present invention.

In this case, the flat outer circumferential surface includes an outer circumferential surface of an inclined portion 171 formed to be integral with the screw body (injection member body) 52, and an outer circumferential surface of a large-diameter portion 172 formed to be integral with the inclined portion 171 and to have an inclined outer circumferential surface. The inclined portion 171 forms a first inclined portion, and the large-diameter portion 172 forms a second inclined portion.

The angle θ1 between the outer circumferential surface of the inclined portion 171 and the axis of the heating cylinder (cylinder member) 17 and the angle θ2 between the outer circumferential surface of the large-diameter portion 172 and the axis of the heating cylinder 17 are set to satisfy the following relation.

$$0° \leq \theta2 \leq \theta1 \leq 60°$$

In this case, the characteristics of the injection apparatus change as shown in FIG. 4 when the ratio L/D; i.e., the ratio of the axial length L of the large-diameter portion 172 to the flight crest diameter D is changed.

Further, the characteristics of the injection apparatus change as shown in FIG. 5 when the front end (the largest diameter portion) of the large-diameter portion 172 has a diameter d2 and the ratio t1/t2; i.e., the radial distance t1 between the outer circumferential surface of the front end of the large-diameter portion 172 and the circumferential edge of the flight 53 to the radial distance t2 between the outer circumferential surface of the screw body 52 and the circumferential edge of the flight 53.

This structure more reliably prevents stagnation of resin in the vicinity of the pressure member 54 even when resin speed decreases, to thereby prevent generation of resin burning more reliably.

Next, a third embodiment of the present invention will be described. Notably, components having the same structures as those in the first embodiment are denoted by the same reference numerals, and their repeated descriptions are omitted. For the effect that the third embodiment yields through employment of the same structure, the description of the effect of the first embodiment is incorporated herein by reference.

Figure 7:
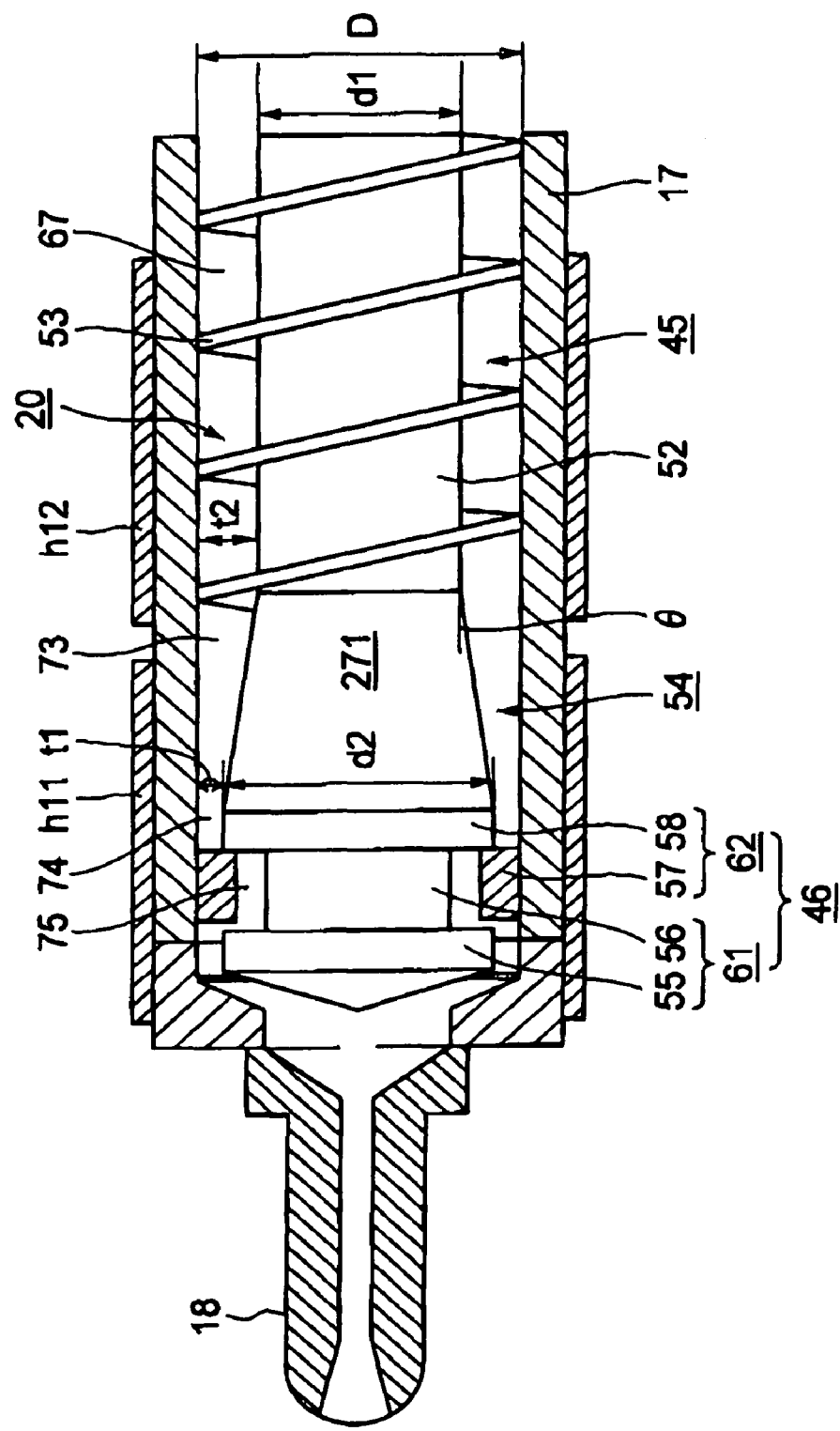
FIG. 7 is an enlarged view showing a main portion of an injection apparatus according to a third embodiment of the present invention.

FIG. 7 is an enlarged view showing a main portion of an injection apparatus according to the third embodiment of the present invention.

In this case, the pressure member 54 includes an inclined portion 271 whose diameter increases toward the front, has a conical shape, and serves as a pressure portion. The inclined portion 271 has a flat outer circumferential surface having no unevenness.

The angles θ1 and θ2 in the second embodiment of the present invention are made equal to each other, and the angle θ between the outer circumferential surface of the inclined portion 271 and the axis of the heating cylinder 17 is set to satisfy the following relation.

$$0° \leq \theta \leq 60°$$

Accordingly, even when resin speed decreases further, stagnation of resin in the vicinity of the pressure member 54 can be prevented more reliably, and generation of resin burning can be prevented more reliably.

The present invention is not limited to the above-described embodiments. Numerous modifications and variations of the present invention are possible in light of the spirit of the present invention, and they are not excluded from the scope of the present invention.

INDUSTRIAL APPLICABILITY

The present invention is applicable to injection apparatuses of injection-molding machines.

The invention claimed is:

1. A screw disposed within a heating cylinder such that the screw can rotate and can advance and retreat, a rear end of the screw being connected to a drive apparatus, the screw comprising:
    a screw head;
    a reverse-flow prevention apparatus; and
    a plasticizing member disposed rearward of the reverse-flow prevention apparatus,
    wherein the plasticizing member comprises a screw body, a flight projectingly formed on an outer circumferential surface of the screw body, and a pressure member formed to extend over a predetermined distance from a front end of the screw body and to be located adjacent to the reverse-flow prevention apparatus,
    wherein the pressure member comprises a flat outer circumferential surface comprising a diameter equal to or greater than a diameter of the screw body,
    wherein the flat outer circumferential surface comprises an outer circumferential surface of an inclined portion formed to be integral with the screw body and an outer circumferential surface of a large diameter portion formed to be integral with the inclined portion, and
    wherein, when the axial length of the large diameter portion is represented by L and the outer diameter of the flight is represented by D, the ratio L/D falls within the following range:

$$0.85 < L/D < 1.15.$$

2. A screw according to claim 1, wherein the flat outer circumferential surface comprises an outer circumferential surface of an inclined portion formed to be integral with the screw body.

3. A screw according to claim 2, wherein an angle θ formed between the outer circumferential surface of the inclined portion and the axis of the heating cylinder falls within the following range:

$$0° \leq \theta \leq 60°.$$

4. A screw according to claim 1, wherein the flat outer circumferential surface comprises an outer circumferential surface of a cylindrical columnar portion formed to be integral with the screw body and including constant diameter.

5. A screw according to claim 1, wherein the large diameter portion comprises a cylindrical columnar portion having a constant diameter.

6. A screw according to claim 1, wherein the large diameter portion comprises an inclined portion including an inclined outer circumferential surface.

7. A screw according to claim 6, wherein an angle θ1 formed between the outer circumferential surface of the inclined portion formed to be integral with the screw body and the axis of the heating cylinder and an angle θ2 formed between the outer circumferential surface of the large-diameter portion and the axis of the heating cylinder fall within the following range:

$$0° \leq \theta2 \leq \theta1 \leq 60°.$$

8. A screw according to claim 1, wherein, when the radial distance between the circumferential edge of a front end of the large diameter portion and the circumferential edge of the flight is represented by t1 and the radial distance between the outer circumferential surface of the screw body and the circumferential edge of the flight is represented by t2, the ratio t1/t2 falls within the following range:

$0.06 \leq t1/t2 \leq 1$.

9. An injection apparatus, comprising:
a heating cylinder;
a screw disposed within the heating cylinder such that the screw can rotate and can advance and retreat; and
a drive apparatus disposed at a rear end of the screw,
wherein the screw comprises a screw head, a reverse-flow prevention apparatus, and a plasticizing member disposed rearward of the reverse-flow prevention apparatus,
wherein the plasticizing member comprises a screw body, a flight projectingly formed on an outer circumferential surface of the screw body, and a pressure member formed to extend over a predetermined distance from a front end of the screw body and to be located adjacent to the reverse-flow prevention apparatus,
wherein the pressure member comprises a flat outer circumferential surface comprising a diameter equal to or greater than a diameter of the screw body,
wherein the flat outer circumferential surface comprises an outer circumferential surface of an inclined portion formed to be integral with the screw body and an outer circumferential surface of a large diameter portion formed to be integral with the inclined portion, and
wherein, when the axial length of the large diameter portion is represented by L and the outer diameter of the flight is represented by D, the ratio L/D falls within the following range:

$0.85 < L/D < 1.15$.

10. A pressure member provided on a plasticizing member disposed rearward of a reverse-flow prevention apparatus, the plasticizing member comprising a screw body, and a flight projectingly formed on an outer circumferential surface of the screw body,
wherein the pressure member is formed to extend over a predetermined distance from a front end of the screw body and to be located adjacent to the reverse-flow prevention apparatus,
wherein the pressure member comprises a flat outer circumferential surface comprising a diameter equal to or greater than a diameter of the screw body,
wherein the flat outer circumferential surface comprises an outer circumferential surface of an inclined portion formed to be integral with the screw body and an outer circumferential surface of a large diameter portion formed to be integral with the inclined portion, and
wherein, when the axial length of the large diameter portion is represented by L and the outer diameter of the flight is represented by D, the ratio L/D falls within the following range:

$0.85 < L/D < 1.15$.

11. A screw according to claim 1, wherein an angle $\theta$ formed between the outer circumferential surface of the inclined portion and the axis of the heating cylinder falls within the following range:

$0° \leq \theta \leq 60°$.

* * * * *